July 6, 1965   C. F. KRABBE ETAL   3,193,460
METHOD AND APPARATUS FOR CULTURING MICRO-ORGANISMS
Filed Dec. 21, 1961   2 Sheets-Sheet 1
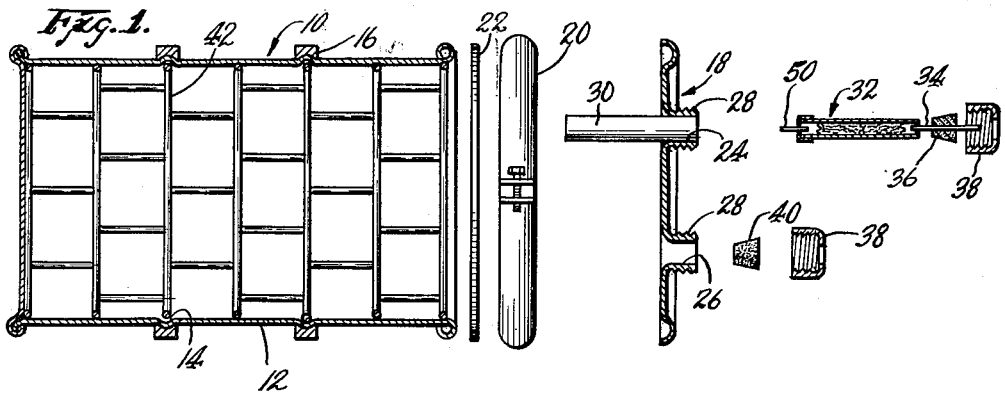
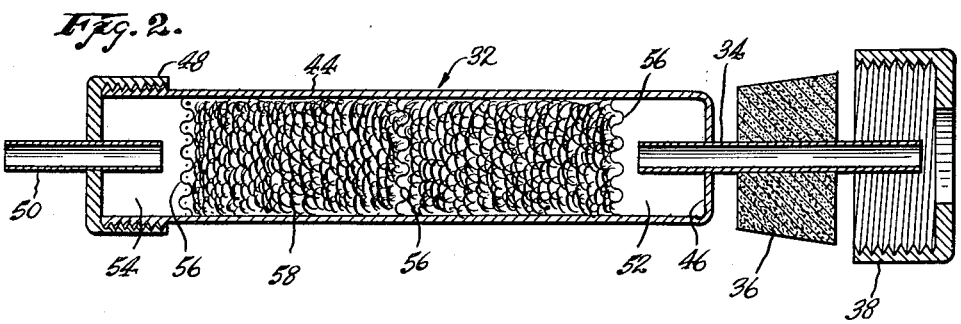
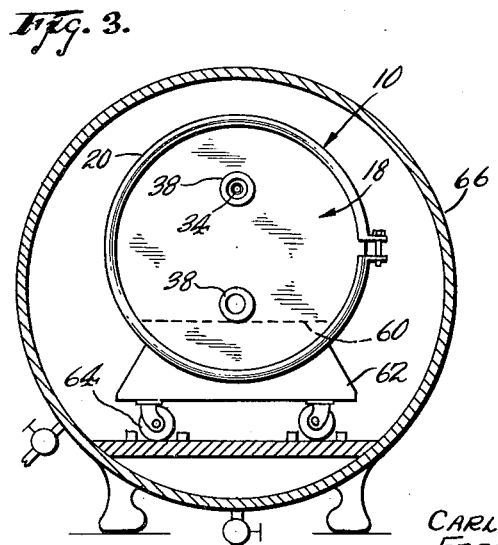
INVENTORS.
CARL F. KRABBE AND
BY FREDERICK D. TAYLOR,
ATTORNEYS July 6, 1965 C. F. KRABBE ETAL 3,193,460
METHOD AND APPARATUS FOR CULTURING MICRO-ORGANISMS
Filed Dec. 21, 1961 2 Sheets-Sheet 2
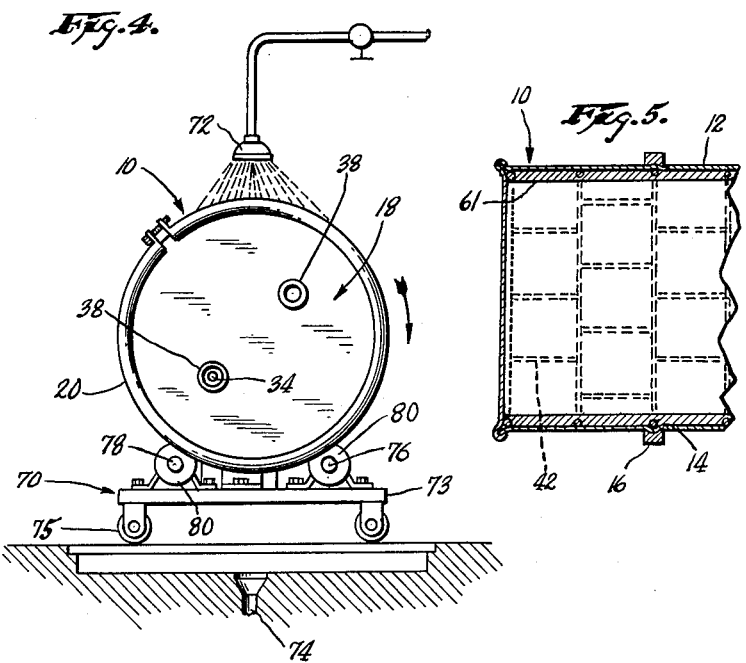
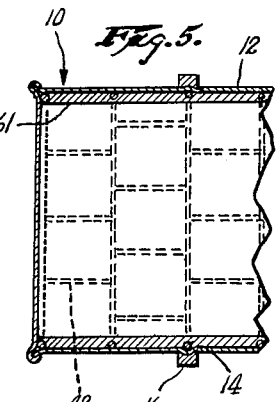
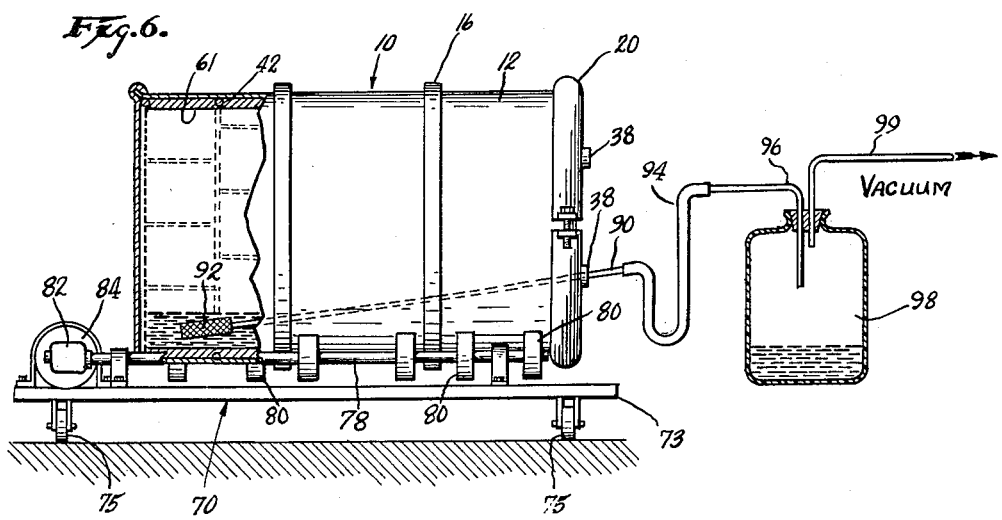
INVENTORS.
CARL F. KRABBE AND
BY FREDERICK D. TAYLOR,
ATTORNEYS.

3,193,460
METHOD AND APPARATUS FOR CULTURING MICRO-ORGANISMS

Carl F. Krabbe, Council Bluffs, Iowa, and Frederick D. Taylor, Ralston, Nebr., assignors to Eli Lilly and Company, Indianapolis, Ind., a corporation of Indiana
Filed Dec. 21, 1961, Ser. No. 161,208
10 Claims. (Cl. 167—78)

This invention relates to the production of Brucella and like organisms, as for use in preparing vaccines, and especially to an improved method and apparatus for this purpose.

In the production of Brucellosis vaccine, it is necessary to grow the Brucella organism on the surface of a growth medium, since growth in liquid medium, especially in the case of certain desirable strains of Brucella organism, results in rapid dissociation of the organism and the production of a rough colony which has reduced antigenic properties instead of the desired smooth colony which has high antigenic properties.

In one common prior practice, the Brucella has been grown on the surface of solidified agar medium in culture bottles such as 5-liter Roux culture bottles. See for example Bulletin AR S–91–24, July 1960, Brucella Abortus Strain 19 Vaccine, published by the Agricultural Research Service of the United States Department of Agriculture. Quantity production by this method requires the handling of many bottles and the eventual pooling of the product from many bottles, which procedure involves many exposures of the product to contamination, and requires much labor and expense.

It is the object of this invention to provide a method and apparatus for the production of Brucella and other like organisms, as for vaccine preparation, which greatly reduces the number of containers required to be handled in the production of a given quantity of vaccine, which facilitates sterilization of the apparatus and growth media and greatly reduces the number and danger of exposures of the growth media to contamination, which provides a large area for surface growth of the organism, which facilitates the preparation of the growth media and the inoculation thereof with the organism, and which provides for convenient and effective harvesting of the culture produced.

In accordance with the invention, the method of producing the organism comprises depositing a layer of solid growth medium on the inner cylindrical surface of a cylindrical container, or on an equivalent line-generated surface such as the conic surface of a frusto-conical container. Conveniently, the medium used is one which is liquid at an elevated temperature and which solidifies on cooling. Potato infusion agar medium described in the above-mentioned Bulletin AR S–91–24 is such a medium. With such a medium the growth layer is desirably prepared by introducing a suitable quantity of the medium into the cylindrical container, for example, sufficient to form a coating of the order of 1 cm. thick on its cylindrical wall, sterilizing the whole with heat at a temperature which leaves the medium in liquid state, and then, desirably after partial cooling at room temperature, flowing the still-liquid medium over the inner surface of the cylindrical container wall, as by rotating the cylindrical container on its axis in a horizontal position, while cooling such wall to solidify the medium in a solid layer thereon. The container desirably has a smooth inner surface to facilitate cleaning, and the solidified layer is retained thereagainst and stabilized by a broken-surface support, such as an open mesh screen adjacent the container wall. The preparation of the growth medium may also include other steps, for example, steps of heating or storing under suitable conditions to ensure a proper moisture content before inoculation.

The cylindrical layer of growth-medium on the wall of the container is then inoculated, or seeded, desirably by introducing a quantity of liquid inoculum into the container and distributing the same over the growth medium. This may be done by again rotating the container for a short time to flow the liquid inoculum over the entire inner surface of the solid cylindrical medium layer carried by the container wall. The inoculated container is then incubated to cause the desired growth of the organism. For this, the containers may be stood on end so that any excess inoculum liquid drains to the bottom end. With Brucella, the inoculated growth medium may be incubated for a period of about 72 hours at a temperature of say 37° C. With Brucella and other organisms which require aerobic conditions, and the container is arranged to communicate with the atmosphere through a suitable filter. For anaerobic organisms, the incubation may be carried out with the container sealed, or in the presence of inert or other suitable gases.

When the desired growth has occurred, the organism may be harvested by introducing into the container a quantity of harvest liquid, such as Brucella stabilizer liquid, and again rotating the cylindrical container on its axis in horizontal position to cause the liquid to wash the culture off the growth surface. This produces a suspension of culture organisms in the harvest liquid, and such suspension is withdrawn for use, as by introducing a suction tube into the container and withdrawing the liquid with suction.

The culture liquid obtained by this method corresponds to that obtained in other culture methods, and may be processed in conventional ways for the preparation of vaccine or for other conventional uses.

The method has been described with reference to a cylindrical container, since such containers are convenient and readily available and therefore preferred, but the process can also be carried out in containers of other line-generated shapes, such as frusto-conical containers, which provide inner surfaces generated by revolution of a straight line about an axis. Such a surface can be rotated about its axis of generation in a position to carry the surface through a liquid supporting horizontal position in which, as with cylindrical surfaces, a liquid will be evenly flowed over the surface as the rotation occurs. For convenience, the term "line-generated surfaces" is used to refer to such surfaces, and as a term to include both cylindrical and conic surfaces.

The method described is especially adapted for the production of *Brucella abortus* for the preparation of vaccine for vaccinating cattle. It may also be used for the production of other Brucella bacilli, such as *Brucella suis* and *Brucella melitensis*; as well as for other organisms which are advantageously grown on the surface of solid state growth media, such as *Hemophilus influenzae, Hemophilus pertussis,* Pasteurellae species, Streptococceae species, Staphylococcus species, and *Erysipelothrix rhusiopathiae.*

In accordance with the apparatus aspects of the invention, the cylindrical container used is desirably a cylindrical stainless steel drum provided with a removable drum head or lid having a breather opening closed by an air filter and an access opening closed by a removable closure. An open-mesh screen is fitted against the inner cylindrical wall of the drum to facilitate formation and retention of the growth medium layer, and is desirably removable through the end of the drum when the lid is removed. A roller carriage is provided for rotating the drum on its axis in a horizontal position. This is conveniently a carriage having spaced rollers forming a cradle adapted to support a drum in horizontal position and provided with a suitable roller drive to rotate the supported drum on its axis. The same cradle may be used for a plurality of drums, and the drums removed therefrom to simple stands or dollies during incubation.

The accompanying drawings illustrate the invention. In such drawings:

FIG. 1 is an exploded view showing a processing container in accordance with the invention, with the drum and certain other parts in longitudinal section and with other parts in side elevation;

FIG. 2 is a longitudinal section on an enlarged scale of the air filter assembly shown in FIG. 1;

FIG. 3 is a diagrammatic view showing the processing container in place in a treatment chamber, as for sterilizing under steam pressure or for incubating at controlled temperature;

FIG. 4 is an end elevation of the processing container on a roller carriage and in relation to a cooling spray and drain;

FIG. 5 is a partial section showing the cylindrical layer of growth-media on the inner surface of the container wall; and FIG. 6 is a side elevation with parts in section, of the processing container on the roller carriage, and association with suction withdrawal apparatus for recovering the culture suspension from the container.

The processing apparatus shown in the drawings comprises a stainless steel drum 10 of standard 55-gallon capacity and of conventional construction. This includes a substantially cylindrical wall 12 having a pair of spaced circumferential beads 14 desirably fitted with tire rings 16. One end wall of the drum is removable as a lid 18 and may be secured in place by a ring clamp 20 and sealed with a gasket 22.

In accordance with the invention, the lid has two openings 24 and 26, positioned at points spaced inward from the cylindrical wall of the drum. Each opening is provided with a pipe flange fitting 28, and the opening 24 is fitted with an inwardly extending tube 30 for the reception of an air filter 32. Such filter includes an outer end tube 34, and is mounted in sealed relation with the drum by means of a rubber stopper 36 held in place by a pipe flange collar 38. The opening 26 may be closed by a solid rubber stopper 40 held in place by a second flange collar 38. An open mesh cylindrical retention screen 42, made of stainless steel wire, is fitted inside the drum 10, in resilient engagement with its cylindrical wall 12.

The air filter 32, shown on an enlarged scale in FIG. 2, consists of a cartridge having an outer cylindrical wall 44 closed at its outer end by an end wall 46 connected to the outer breather tube 34. The inner end of the cartridge is closed by a cap 48 provided with a central communication tube 50. The communication tubes 34 and 50 in the end walls of the cartridge 32 desirably project a short distance into the cartridge and connect with open chambers 52 and 54 so that any liquid which enters will be received and trapped in such chambers without clogging the openings. Between the chambers 52 and 54 the cartridge is subdivided by a plurality of transverse screens 56, and the space between such screens is filled with a fibrous filter material 58 such as glass wool or cotton.

For use, the drum 10 shown in FIG. 1 and its associated parts are assembled in the relationship indicated. Lid 18 is placed on the end of the drum in sealing relationship with the gasket 22 and secured in place by the clamping ring 20. The air filter 32 is inserted in its tube 30, and the opening 24 is sealed by the rubber stopper 36 held in place by the pipe cap 38, with the breather tube 34 extending through the stopper 36 and the cap 38. A quantity of growth medium is introduced through the access opening 26 and such opening is closed by the rubber stopper 40 held in place by the pipe cap 38. The cylindrical drum forms a sealed container which communicates with the atmosphere only through the communication tubes 34 and 50 and the packing 58 of the filter 32.

For convenience in sterilizing the container 10 and the growth media 60 contained therein, the drum may be mounted on a wheeled dolly 62 provided with suitable caster wheels 64, and the sterilization may be carried out in an autoclave 66 as shown in FIG. 3.

For the purpose of distributing the growth media 60 over the inner cylindrical wall surface of the container 10, the drum, after autoclaving, may be mounted on a roller carriage 70 positioned over a drain 74, where it can be cooled with water as from a water spray head 72 or from a hose. The roller carriage 70 conveniently consists of a frame 73 mounted on wheels 75. Two shafts 76 and 78 are mounted in spaced parallel relation on the frame 73, and carry rollers 80 on which the drum 10 may be supported in horizontal position. Conveniently the shaft 76 may be a fixed shaft and its rollers 80 may be freely rotatable thereon, while the shaft 78 is a rotatable shaft with some or all of its rollers 80 fixed thereon, and the shaft 78 is connected through a gear reduction 82 to a motor 84 by which the shaft 78 and its rollers may be driven to rotate the drum 10 in a horizontal position on its axis.

For withdrawing the harvest liquid from the drum 10, we may use the equipment shown in FIG. 6. This consists of a movable suction tube 90 having a coarse inlet screen 92 at its free end, and connected by a flexible tube 94 to the inlet fitting 96 of a container 98 provided with a suction fitting 99 for connection to a source of vacuum.

In using the apparatus shown in the drawings for carrying out the new method of growing Brucella, the drum 10 is assembled as indicated in FIG. 1 and as described above to form a closed container which communicates with the atmosphere only through the filter cartridge 32. A quantity of a solid type culture medium for Brucella production is added to each 55 gallon drum in an amount sufficient to form a growth layer of desired thickness on the cylindrical call. This may be a thickness of the order of from 0.5 to 1.5 cm. The drums containing the culture medium 60 are sterilized as in autoclave 66 either on dollys as indicated in FIG. 3 or in vertical position. At sterilizing temperature the growth medium is normally in liquid state, and lies in a pool at the bottom of the drum 10. After sterilization, the drum is removed from the autoclave and is desirably partially cooled at room temperature, to a temperature which leaves the medium in liquid state, and is then placed on the roller carriage 70 as shown in FIG. 4. The motor 84 is operated to rotate the rollers of such carriage, and this causes the drum 10 to be steadily rotated on its axis in a horizontal position. At the bottom of the drum, its cylindrical surface travels through a liquid-supporting horizontal position, and this movement flows the liquid culture medium over the cylindrical inner surface of the drum wall 12. Meanwhile, such wall 12 is cooled by a spray of cooling water from the spray-head 72 or by manual application of a stream of water from a hose until the drum temperature is well below the solidification temperature of the medium. This causes the culture medium to solidify on the wall 12 to form a substantially uniform layer 61 on the inner surface of such wall 12. This is retained by the wire mesh 42 and is sufficiently stable to permit reasonable handling of the drum 10.

When the solid layer 61 of culture medium has been formed on the inner surface of the drum 10, a suitable quantity of liquid inoculum is added to the drum through the access opening 26 in an amount sufficient to be flowed over the entire surface of the growth layer. This may be of the order of 200 ml. of such liquid. The drum is then again rotated on its axis on the roller carriage 70 to distribute the inoculum over the entire surface of the cylindrical layer 61 of culture medium. The inoculated drum may now be removed from the roller carriage 70 to the dolly 62, and placed on end in an incubation room where it is held at a suitable incubating temperature for a sufficient time to produce the desired growth of the culture organism. In the case of Brucella, this may be the order of 72 hours at 37° C.

At the end of the incubation period, the drum is removed from the incubation room and placed again on the roller dolly 70. A suitable quantity of harvest or wash liquid is then introduced into the drum, for example approximately 2000 ml. of Brucella harvest liquid, and the drum is rotated on its axis on the carriage 70 for a period of say five to ten minutes to cause the harvest liquid to gently flow over and wash the surface of the solid layer 61 of culture medium. This washes the culture cells off the culture medium and places them in suspension in the harvest liquid. The resulting liquid suspension is then withdrawn from the drum 10 in any suitable manner. With the apparatus shown in FIG. 6, such withdrawal is carried out by inserting the suction tube 90 through the access opening 26 of the drum into the pool of liquid in the drum 10. By applying suction to the container 98 through the suction connection 99, the liquid will be withdrawn from the drum into the container 98.

The treatment of the culture organisms produced forms no part of my present invention, and may be in accordance with the conventional procedure.

The invention is further illustrated by the following examples:

*Example 1*

Sixteen agar slants in 100-ml. tubes, each tube containing 40 ml. of solidified potato infusion agar (p. 7 of ARS-91-24), were inoculated with *Brucella abortus* and incubated for approximately 72 hours at 37° C. The resulting growth was washed from each tube with 10 ml. of sterile buffered saline and transferred aseptically into a 5-liter toxin bottle containing 450 ml. of solidified potato infusion agar. Sixteen bottles were thus inoculated and incubated at 37° C. for 72 hours.

Into a clean stainless-steel cooker were charged 140 liters of potato infusion agar, and the cooker was heated sufficiently to melt the medium. The melted material was dispensed into sixteen stainless-steel drums 10 of the design described above, 8 liters per drum, and into twenty-one 5-liter toxin bottles, 450 ml. per bottle. The drums and bottles were steam-sterilized in an autoclave at 121° C. and 15 p.s.i. pressure for 45 minutes, and were removed from the autoclave after the temperature had dropped below 100° C.

The bottles were cooled to room temperature in the horizontal position, the agar being allowed to gel on the deep side of the bottle. The bottles were reserved for seed preparation in subsequent batches.

The drums were placed on the roller carriage 70 and, beginning 15 to 20 minutes after removal from the autoclave, were rolled on the carriage in horizontal position and were cooled with a stream of water to room temperature, so that the medium solidified as a layer covering the inner cylindrical surface of the drum.

Into each of the incubated seed bottles were aseptically introduced 200 ml. of buffered saline and the bottle was agitated to wash the growth from the agar. The resulting suspension was examined microscopically by use of Gram stain to detect any unsatisfactory cultures. The suspension from each bottle was then transferred aseptically to a drum, after which the drum was rolled for 3 to 5 minutes, then incubated at rest in upright position for 72 hours at 37° C.

The incubated drums were examined for contamination, and one was discarded. Into each of the remaining 15 drums were aseptically added approximately 2 liters of buffered saline solution as Brucella stabilizer and harvest liquid (ARS-91-24), the drum was rolled for approximately 10 minutes, and the resulting suspension was aseptically syphoned into a 5-liter toxin bottle. Each of the bottles was tested for bulk purity by inoculating 0.5 and 1.0 ml. samples into two tubes each of dextrose-starch agar and fluid thioglycollate medium (total of 4 tubes), incubating at 37° C. for 72 hours, and examining for contamination. One bottle was discarded.

The remaining 14 bottles were pooled and commingled with sterile skim milk as a stabilizer. The cell concentration was measured, and the suspension was metered into vaccine vials, frozen, and lyophilized.

*Example 2*

Example 1 is repeated, save that instead of using *Brucella abortus* as the organism, *Brucella suis* is used. In this case the harvested suspension of *Brucella suis* organisms is processed in conventional manner to prepare a hog vaccine.

As noted above, the invention can also be used for the production of other organisms which are produced by surface growth on a stable solid growth medium.

We claim as our invention:
1. The method of producing a culture of a surface-growth microorganism, which comprises
   (a) placing in a cylindrical container a quantity of normally solid culture medium which liquefies under heat,
   (b) sterilizing the container and culture medium at a temperature which leaves the medium in liquid state,
   (c) rotating the container on its axis in a horizontal position to flow the liquid medium over the cylindrical wall of the container,
   (d) meanwhile cooling said wall to solidify the culture medium on said wall to form a surface-growth layer on the inner surface thereof,
   (e) introducing a quantity of liquid inoculum and rotating the container to distribute the inoculum over the surface-growth layer to inoculate the same,
   (f) subjecting the inoculated layer to incubation conditions to produce culture growth thereon,
   (g) introducing a quantity of harvest liquid and rotating the container on its axis to wash the harvest liquid over the growth-containing surface to form a suspension of culture organisms in the harvest liquid,
   (h) and recovering said suspension.
2. The method defined in claim 1,
   (a) in which the container is incubated in upright position to drain any excess inoculum liquid to one end of the container.
3. The method defined in claim 1,
   (a) with the addition of providing retention means adjacent said inner wall surface and solidifying the surface-growth layer in supported relation therewith.
4. The method defined in claim 1 in which the surface-growth microorganism is a Brucella organism.
5. The method defined in claim 1 in which the surface-growth microorganism is *Brucella abortus*.
6. The method of producing a culture of a surface-growth microorganism, which comprises
   (a) forming a retained solid cylindrical layer of surface-growth culture medium against the inner cylindrical surface of a cylindrical container,
   (b) distributing a quantity of liquid inoculum over the surface of said layer by rotating the container on its axis in a horizontal position,
   (c) subjecting the inoculated retained layer to incubating conditions to produce culture growth thereon,
   (d) flowing a quantity of harvest liquid over the growth-containing layer by rotating the container on its axis in a horizontal position to thereby produce a suspension of growth organisms in the harvest liquid,
   (e) and recovering such harvest liquid.
7. The method of producing a culture of a surface-growth microorganism, which comprises
   (a) forming on the inner surface of a container wall of line-generated configuration a layer of surface-growth medium, (b) introducing a quantity of liquid inoculum and rotating said wall on its axis in a position to flow said liquid over said layer to inoculate the same, (c) subjecting the inoculated layer to incubation conditions to produce culture growth thereon, (d) introducing a quantity of harvest liquid and again rotating said wall on its axis in a position to flow the harvest liquid over the growth-containing surface to form a suspension of culture organisms in the harvest liquid, and (e) recovering said suspension.

8. The method of producing a culture of a surface-growth microorganism, which comprises (a) placing a quantity of heat-liquefiable, normally-solid growth medium in a container having a side wall of line-generated configuration, (b) rotating the container, with the growth medium in liquid state therein, on its axis in a position to distribute the liquid over the inner surface of said side wall, (c) cooling the side wall during such rotation to solidify the medium and form a surface-growth layer on said inner surface, (d) inoculating the surface of said layer, (e) subjecting the inoculated layer to incubation conditions to produce culture growth thereon, (f) introducing a quantity of harvest liquid and rotating said container on its axis in a position to flow the harvest liquid over the growth-containing surface of said layer to produce a suspension of growth organisms in the harvest liquid, and (g) recovering said suspension.

9. Apparatus for producing a culture of a surface-growth microorganism, comprising (a) a cylindrical drum having a removable end wall forming a closure, (b) an open-mesh liner removably mounted against the inner cylindrical wall of the drum, (c) an access port in an end wall of said drum and a closure for said port, (d) a filter fitting forming a breather opening in an end wall of the drum, (e) an air filter for said breather opening, and (f) means to rotate the drum on its axis in a horizontal position for distributing a quantity of solidifiable liquid over the inner cylindrical surface thereof, (g) said port and fitting being spaced inward from the cylindrical wall to avoid contact with the liquid during such distribution.

10. Apparatus for producing a culture of a surface-growth microorganism, comprising (a) a container having a continuous wall of line-generated configuration and having an end opening at one end of said wall, (b) a removable end wall forming a closure for said opening and means for securing and sealing the same in closing relation on said container, (c) retention means overlying the inner surface of said line-generated wall for retaining a layer of solidified growth medium thereon, (d) said retention means being removable through said opening when said closure is released from the container, (e) and bearing means for supporting said container for rotation on the axis of said line-generated wall in a position to flow solidifiable liquid over the inner surface of said wall, (f) and breather means for said container communicating with the interior thereof at a point spaced inward from said inner surface to avoid contact with liquid being flowed over said surface.

References Cited by the Examiner
UNITED STATES PATENTS 2,686,754  8/54  Monod _____ 195—142
2,996,426  8/61  Toulmin _____ 167—78

FOREIGN PATENTS 625,120  8/61  Canada.
850,611  10/60  Great Britain.

JULIAN S. LEVITT, *Primary Examiner.*

M. O. WOLK, LEWIS GOTTS, *Examiners.*